United States Patent
Lu

(10) Patent No.: US 6,648,257 B2
(45) Date of Patent: Nov. 18, 2003

(54) EXTENDIBLE CRANK OF FISHING REEL

(76) Inventor: Han-Chi Lu, No. 22, Jien Ren Street, Taichung City (TW)

(*) Notice: Subject to any disclaimer, the term of this patent is extended or adjusted under 35 U.S.C. 154(b) by 131 days.

(21) Appl. No.: 10/056,396

(22) Filed: Jan. 28, 2002

(65) Prior Publication Data

US 2003/0140548 A1 Jul. 31, 2003

(51) Int. Cl.[7] .................... A01K 89/00; A01K 89/01; A01K 89/015
(52) U.S. Cl. ................................ 242/284; 74/545
(58) Field of Search ................... 242/284, 283, 242/282; 74/545; 16/405, FOR 115

(56) References Cited

U.S. PATENT DOCUMENTS

| | | | | |
|---|---|---|---|---|
| 1,510,345 A | * | 9/1924 | Robertson | 254/102 |
| 2,062,108 A | * | 11/1936 | Rickerson | 403/348 |
| 5,507,204 A | * | 4/1996 | Diffrient | 74/545 |
| 5,526,713 A | * | 6/1996 | Walter | 74/545 |
| 5,833,039 A | * | 11/1998 | Kotkins, Jr. | 190/115 |
| 5,927,451 A | * | 7/1999 | Tsai | 190/115 |
| 6,158,089 A | * | 12/2000 | Monahan et al. | 16/429 |
| 6,364,229 B1 | * | 4/2002 | Kang | 242/283 |
| 6,382,543 B1 | * | 5/2002 | Chang | 242/249 |
| 6,408,713 B1 | * | 6/2002 | Mitsch | 74/545 |
| 6,595,713 B1 | * | 7/2003 | Wilson | 403/7 |

\* cited by examiner

Primary Examiner—Emmanuel M Marcelo
(74) Attorney, Agent, or Firm—Charles E. Baxley

(57) ABSTRACT

A crank assembly of fishing reel includes a tube having a passage which includes a circular section and a polygonal section. A crank includes a first section with circular cross section and a second section with polygonal cross section. The first section is movably received in the circular section of the passage and the second section is movably received in the polygonal section of the passage. The crank can be extended by pulling to increase the length of the crank.

5 Claims, 7 Drawing Sheets

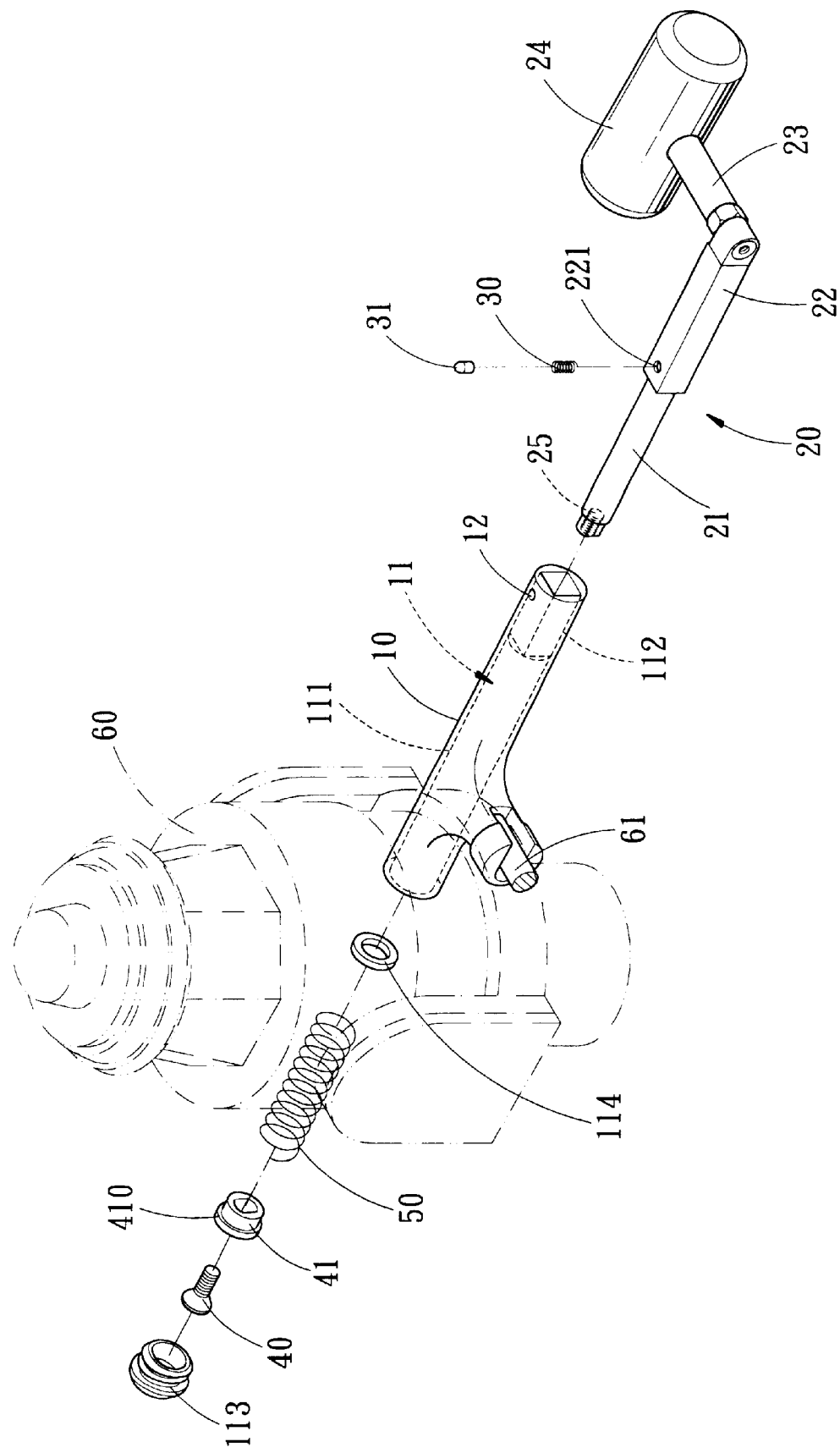
F I G. 1

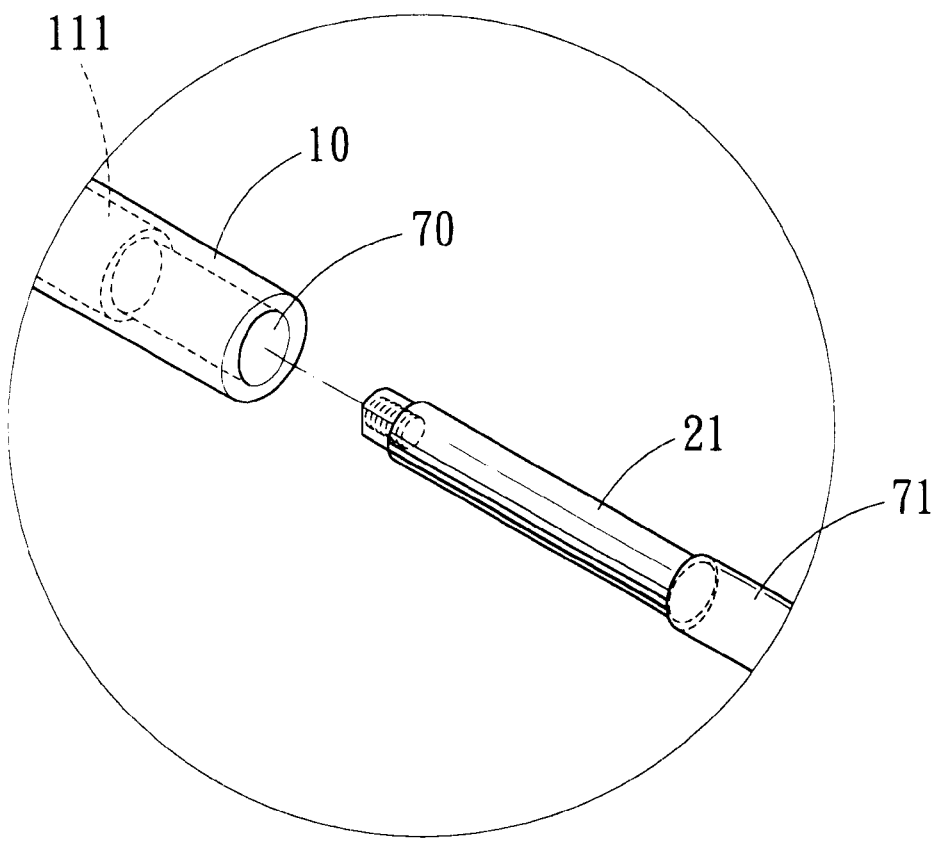
F I G. 7

EXTENDIBLE CRANK OF FISHING REEL

FIELD OF THE INVENTION

The present invention relates to an extendible crank of fishing reel so as to increase the arm of force when rotating the crank.

BACKGROUND OF THE INVENTION

A conventional fishing reel generally is attached to the fishing rod and includes a mandrel around which the fishing line is scrolled. A crank is connected to the mandrel so that when rotating the crank, the fishing line is scrolled back and the fish on hook can be pulled close to the user. The conventional crank has a fixed length which is the arm of force when rotating the crank. When a heavy fish is on hook, the user has to use a larger force to rotate the crank to retrieve the fishing line and to pull the fish back. Therefore, if the arm of force is short, it is difficult for the user to rotate the crank. Besides, the fishing reel is usually connected to the handle of the fishing rod and the user holds the handle with one hand and uses the other hand to rotate the crank of the fishing reel. The crank could hit the hand holding the handle.

SUMMARY OF THE INVENTION

In accordance with one aspect of the present invention, there is provided a crank assembly of the fishing reel and the assembly comprises a tube having a passage including a circular section and a polygonal section.

A crank includes a first part and a second part which extends perpendicularly from the first part. The first part is movably inserted in the passage and includes a first section having a circular cross section so as to be movably received in the circular section of the passage, and a second section having a polygonal cross section so as to be movably received in the polygonal section of the passage. A recess is defined in a side of the polygonal section and a bead and a first spring are received in the recess.

A second spring is mounted to the first section and an end member fixedly connected a distal end of the first section.

The primary object of the present invention is to provide an extendible crank of a fishing reel and the crank can be extendible so as to increase the arm of force when rotating the crank.

The other object of the present invention is to provide a crank assembly wherein the a proper angle is defined between the axis of the fishing rod and the crank so as to enhance the use of convenience.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 1 is an exploded view to show the crank assembly of a fishing reel of the present invention;

FIG. 7 shows that the polygonal section of the tube can be an oval section.

DETAILED DESCRIPTION OF THE PREFERRED EMBODIMENT

Figure 2:
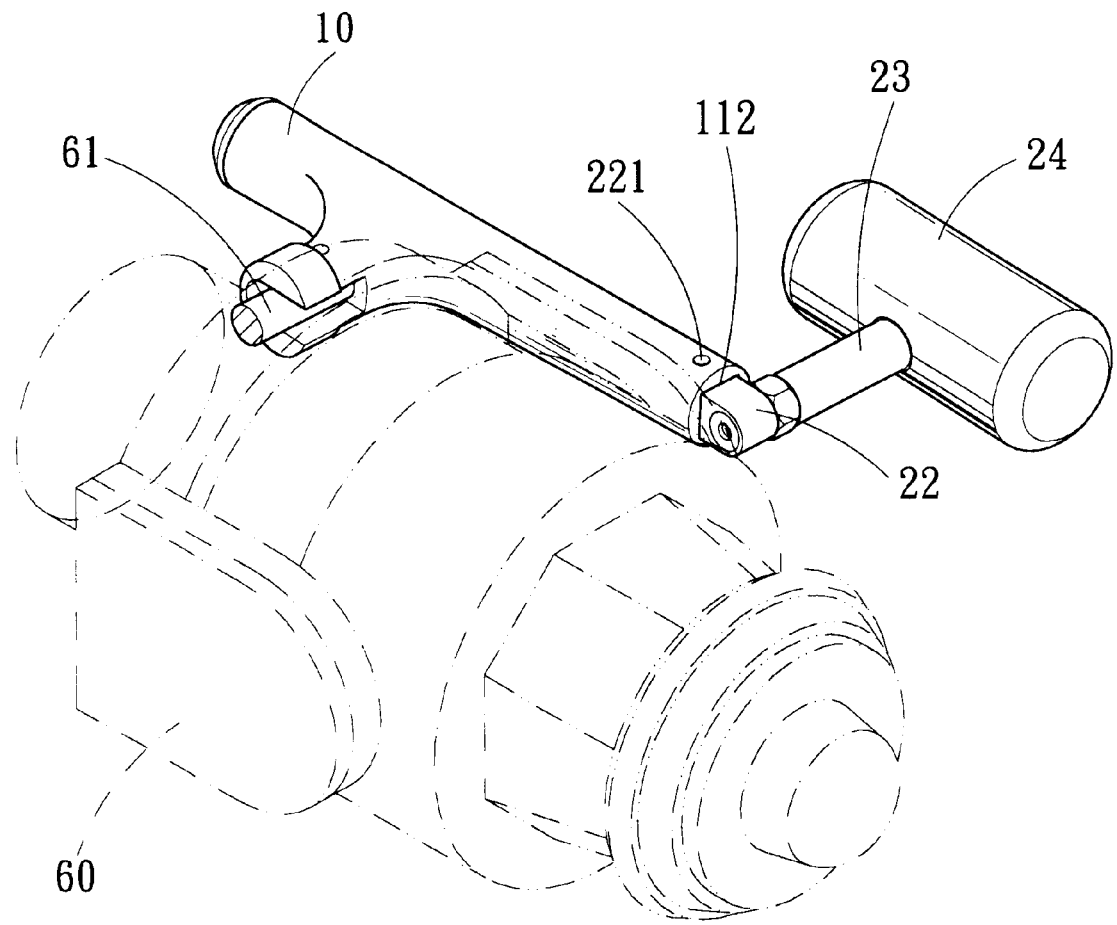
FIG. 2 is a perspective view to show the crank assembly of the fishing reel of the present invention.
Figure 3:
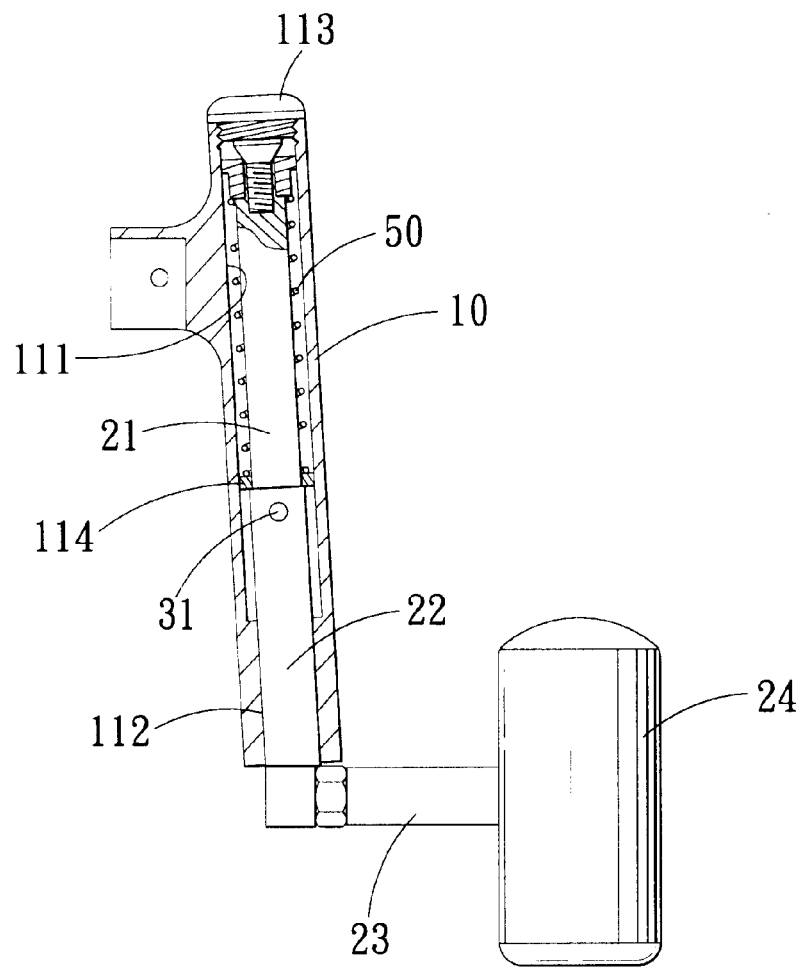
FIG. 3 is a cross sectional view to show the assembly of the crank assembly of a fishing reel of the present invention.
Figure 6:
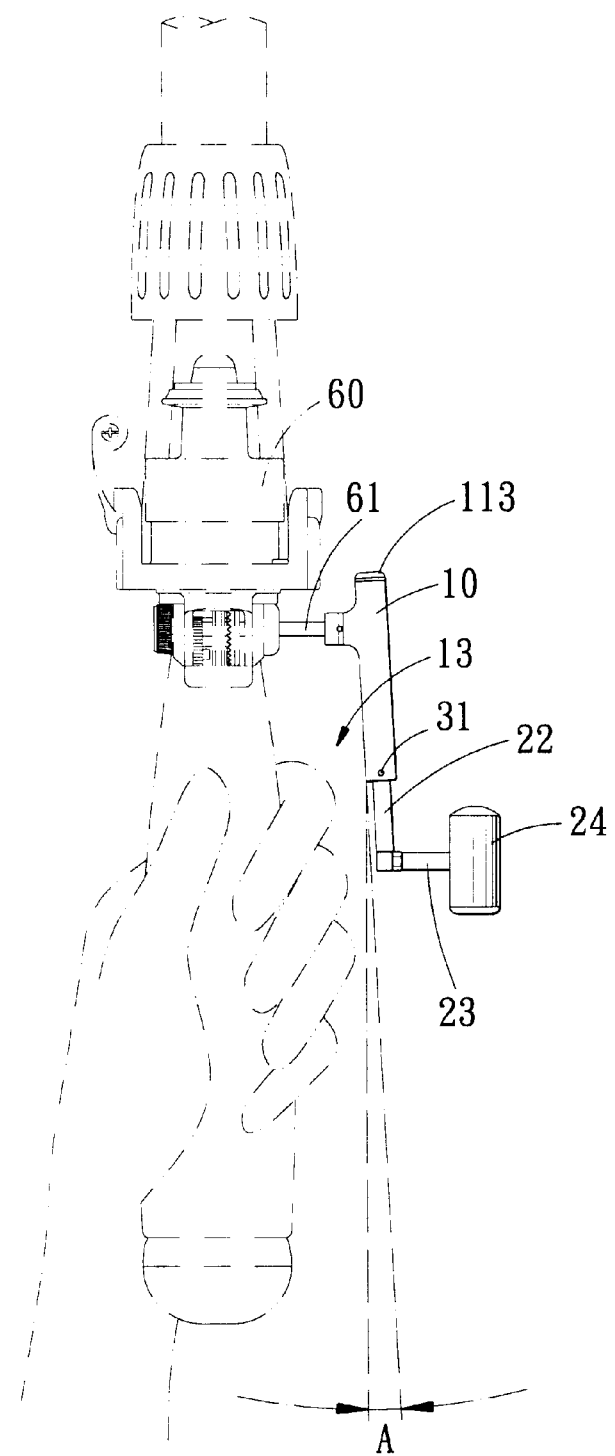
FIG. 6 shows an angle is defined between two respective axes of the tube of the crank assembly of the present invention and the fishing rod.

Referring to FIGS. 1 to 3, a fishing reel 60 is connected to a fishing rod as shown in FIG. 6 and a crank assembly of the present invention is connected to the fishing reel 60 and includes a driving shaft 61 which is engaged with the mandrel (not shown) of the fishing reel 60. The crank assembly comprises a tube 10 having a passage 11 defined therethrough and the passage 11 includes a circular section 111 and a polygonal section 112. The driving shaft 61 extends radially from the tube 10. An aperture 12 is defined through a wall of the polygonal section 112 of the tube 10.

A crank includes a first part 20 and a second part 23 which extends perpendicularly from the first part 20 and a knob 24 is connected to the second part 23. The first part 20 is movably inserted in the passage 11 and includes a first section 21 and a second section 22. The first section 21 has a circular cross section so as to be movably received in the circular section 111 of the passage 11 and the second section 22 has a polygonal cross section so as to be movably received in the polygonal section 112 of the passage 11. The polygonal cross section and the polygonal section 112 in this embodiment means rectangle. A recess 221 is defined in a side of the polygonal section 22 and a bead 31 and a first spring 30 are received in the recess 221.

A ring 114 is received in the circular section 111 and located at the conjunction portion of the circular section 111 and the polygonal section 112. A second spring 50 IS mounted to the first section 21 and an end member 41 having a flange 410 is received in the circular section 111 in the tube 10. A screw 40 extends through the end member 41 and is engaged with a threaded hole 25 defined in the distal end of the first section 21. The second spring 50 is biased between the ring 114 and the flange 410. A cap 113 is threadedly sealing the circular section 111 of the tube 10.

An angle "A" as shown in FIG. 6 is defined between an axis of the tube 10 and an axis of the fishing rod so that a space 13 allows the hand holding the fishing rod will not be hit by the crank when operating the crank.

Figure 4:
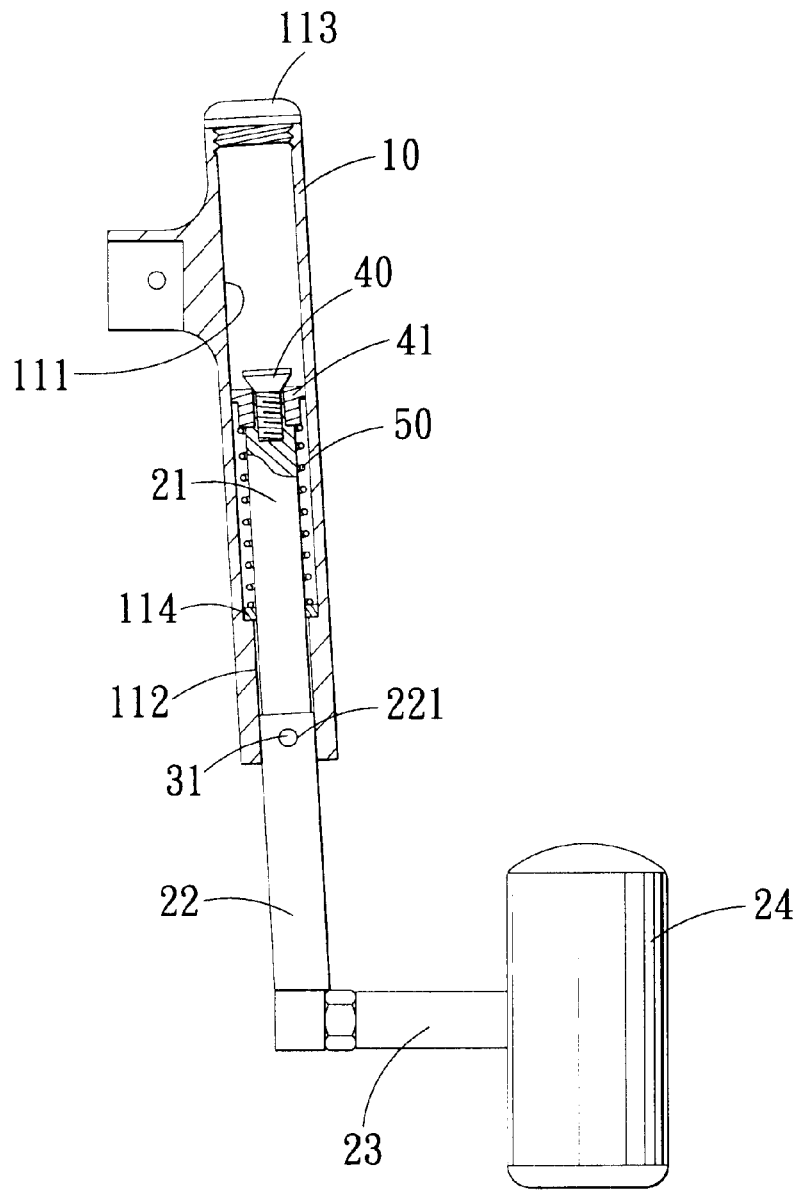
FIG. 4 is a cross sectional view to show the assembly of the crank assembly when the crank is extended.
Figure 5:
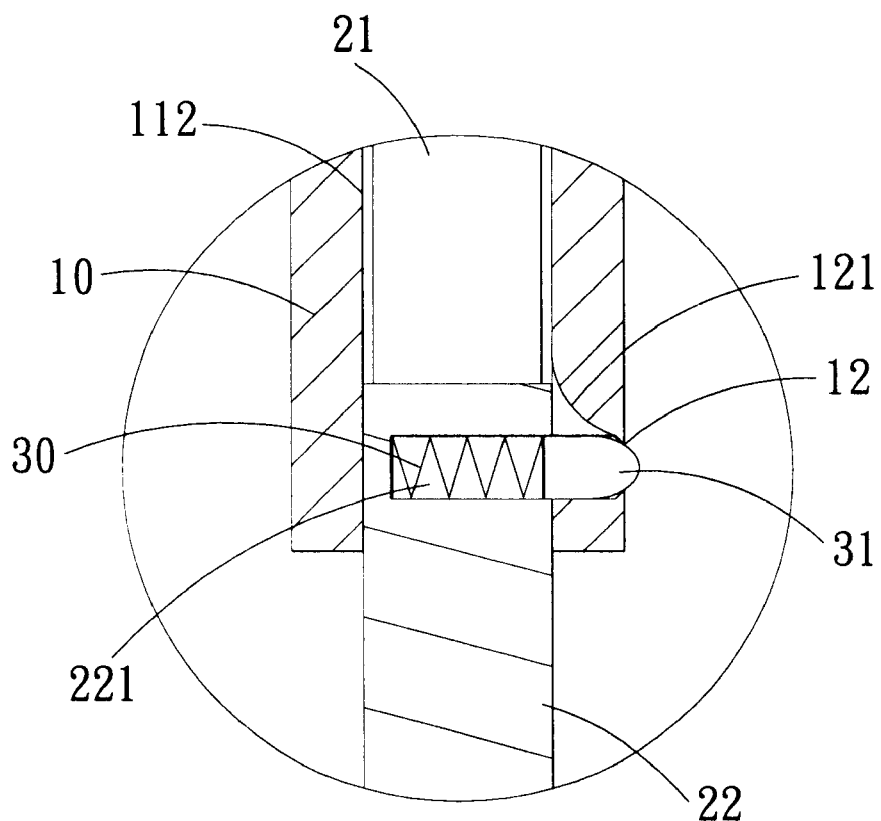
FIG. 5 is a cross sectional view to show the bead is inserted in the aperture of the tube when the crank is extended.

As shown in FIGS. 4 and 5, when pulling the crank away from the fishing reel 60, the bead 31 is moved with the second section 22 of the first part 20 of the crank till the bead 31 is engaged with the aperture 12 in the tube 10 to prevent the first part 20 of the crank from pulling out from the tube 10. A rounded inside 121 is defined in the aperture 12 so that the bead 31 is easily to be inserted in the aperture 12. Therefore, the length of the first part 20 of the crank is increased and the arm of force is increased. The user can easily rotate the crank to pull the fish on hook. The polygonal section 22 of the first part 20 of the crank ensures that the crank will not rotate about the axis of the tube 10 and the knob 24 is located at a position that the user can hold it every time.

FIG. 7 shows that the polygonal section of the passage can be an oval section 70 and the polygonal section of the crank can be an oval section 71.

While we have shown and described the embodiment in accordance with the present invention, it should be clear to those skilled in the art that further embodiments may be made without departing from the scope of the present invention.

What is claimed is:

1. A fishing reel connected to a fishing rod and a crank assembly of the fishing reel including a driving shaft which is engaged with the mandrel of the fishing reel, the crank assembly comprising:

a tube having a passage defined therethrough and the passage including a circular section and a polygonal section, an aperture defined through a wall of the polygonal section of the tube;

a crank including a first part and a second part which extends perpendicularly from the first part, the first part movably inserted in the passage and including a first section and a second section, the first section having a circular cross section so as to be movably received in the circular section of the passage and the second section having a polygonal cross section so as to be movably received in the polygonal section of the passage, a recess defined in a side of the polygonal section and a bead and a first spring received in the recess, and a second spring mounted to the first section and an end member fixedly connected a distal end of the first section.

2. The crank assembly as claimed in claim 1 further comprising a ring received in the circular section and the end member having a flange, the second spring biased between the ring and the flange.

3. The crank assembly as claimed in claim 2 further comprising a screw extending through the end member and engaged with a threaded hole defined in the distal end of the first section.

4. The crank assembly as claimed in claim 1 further comprising a cap threadedly sealing the circular section of the tube.

5. The crank assembly as claimed in claim 1 wherein an angle is defined between an axis of the tube and an axis of the fishing rod.

* * * * *